Patented Dec. 17, 1940

2,225,443

UNITED STATES PATENT OFFICE 2,225,443

AZO DYESTUFFS

Richard Fleischhauer and Ernst Korten, Frankfort-on-the-Main-Fechenheim, Germany, assignors to General Aniline & Film Corporation, a corporation of Delaware No Drawing. Application January 30, 1939, Serial No. 253,608. In Germany January 25, 1938

6 Claims. (Cl. 260—163)

The present invention relates to azo dyestuffs. We have found that compounds of the following general formula:

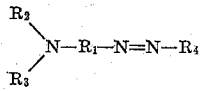

wherein $R_1$ represents an aryl group of the benzene series, $R_2$ represents a member of the group consisting of aryl of the benzene series, aralkyl of the benzene series, cycloalkyl and alkyl containing less than ten carbon atoms, $R_3$ represents the radical of a carboxylic acid of the formula —CO—X wherein X represents a member of the group consisting of alkyl, -alkyl-cycloalkyl and cycloalkyl, the sum of the carbon atoms in the carboxylic acid radical amounting to at least six, the sum of the carbon atoms in the radicals $R_2$ and $R_3$ amounting to at least twelve, $R_4$ represents the radical of a coupling component of the group consisting of pyrazolone-1-aryl-sulfonic acids, aryl being of the benzene series, and 1-acylamino-8-hydroxy-naphthalene-disulfonic acids, are new valuable azo dyestuffs which are especially suitable for dyeing wool or silk. They are obtainable by combining a pyrazolone-sulfonic acid or a peri-acylaminohydroxy-naphthalene-disulfonic acid with a diazo compound of an aromatic amine having the following general formula:

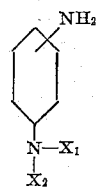

wherein the free amino group may stand in ortho-, meta- or para-position to the substituted amino group, and wherein $X_1$ stands for a member of the group consisting of aryl, aralkyl or cycloalkyl and alkyl containing less than ten carbon atoms, and $X_2$ represents the radical of a carboxylic acid of the formula —CO—Y wherein Y represents a member of the group consisting of alkyl, -alkyl-cycloalkyl and cycloalkyl, the sum of the carbon atoms in the carboxylic acid radical amounting to at least six, the sum of the carbon atoms contained in $X_1$ and $X_2$ amounting to at least twelve, and wherein the benzene nucleus may contain further substituents, such as methyl, methoxy or chlorine.

The dyeings produced by means of these dyestuffs are distinguished by a very good fastness to washing, fulling and to sea-water and a good fastness to perspiration and to light; furthermore, they display the valuable property of having an especially good affinity for animal fibers when applied in a neutral bath, the dyeing bath being, in most cases, nearly completely exhausted. As is known, this property is of practical importance for certain purposes, in particular for dyeing mixed threads and fabrics made from vegetable and animal fibers. The present process is, therefore, of special technical advantage.

The diazo components used for the present process may be obtained according to known methods, for instance, by causing an aliphatic or cycloaliphatic carboxylic acid chloride containing at least six carbon atoms to act upon a nitroamino-benzene substituted in the amine group by an aromatic or cyclo-aliphatic radical or by an aliphatic radical with less than ten carbon atoms, and reducing the nitro compound thus obtained. It is also possible to cause the above-named carboxylic acid chloride to react with an alkyl- or cycloalkylaminobenzene, then nitrating the acyl derivative thus obtained and reducing the nitro compound formed.

For the present process, it is essential that the acyl radical is of aliphatic or cycloaliphatic nature and contains at least 6 carbon atoms. For it has been ascertained that these radicals surprisingly impart to the dyestuffs a better dyeing power, in a neutral bath, than do aromatic radicals containing the same number of carbon atoms. Thus, the dyestuff described in Example 1 of the present invention, for instance, dyes considerably better, in a neutral bath, than does the corresponding dyestuff containing a phenylacetyl group in the diazo component.

The radicals of the following acids may be named as examples: cyclohexyl-acetic acid, cyclohexyl-propionic acid, hexanoic acid, isoheptanoic acid, n-octanoic acid, capric acid, lauric acid, palmitic acid, stearic acid, and mixtures of such acids obtained by technical processes.

The carbon chains of the acids may also be interrupted by oxygen atoms, such as is, for instance, the case with the isoheptyl-oxy-acetic acid of the formula: $H_{15}C_7$—O—$CH_2$—COOH.

The new azo dyestuffs obtained according to the above-described process are superior to the known dyestuffs having a similar constitution by their better affinity to the fiber in a neutral bath as well as by their better solubility, or by their better fastness to light.

The following examples serve to illustrate the invention but they are not intended to limit it thereto:

1. 31.4 kgs. of 1-amino-4-N-cyclohexyl-cyclohexylacetyl-aminobenzene are diazotized in the usual manner. The diazo-compound obtained is combined with a solution, rendered alkaline with sodium carbonate, of 29 kgs. of 1-(2'-chloro-5'-sulfophenyl)-3-methyl-5-pyrazolone. The dyestuff formed is isolated and dried; it is a green-yellow powder which is soluble in water and dyes wool, in a neutral bath, very fast yellow-greenish tints.

A similar dyestuff having a somewhat enhanced affinity to the fiber is obtained by using as diazo component 1-amino-4-N-cyclohexyl-cyclohexylpropionyl-aminobenzene.

2. 30.4 kgs. of 1-amino-2-methyl-5-N-ethyl-caprinyl-amino-benzene are diazotized and the diazo compound obtained is combined with a solution, alkaline with sodium carbonate, of 26 kgs. of 1-(4'-sulfophenyl)-3-methyl-5-pyrazolone. The dyestuff is isolated and dried; it then constitutes a water-soluble, yellow-brown powder which dyes wool, in a neutral bath, very fast reddish-yellow tints.

A greenish-yellow having the same good properties, but a somewhat enhanced fastness to light, is obtained if 1-(2'-chloro-6'-methyl-4'-sulfophenyl)-3-methyl-5-pyrazolone is used as azo component.

3. 33.2 kgs. of a mixture of amino compounds (obtained by the action of the chlorides of a mixture of fatty acids containing 7–9 carbon atoms upon 1-isoheptylamino-4-nitrobenzene and subsequent reduction of the nitro compounds thus are diazotized. The mixture of diazo compounds thus obtained is combined with a solution, alkaline with sodium carbonate, of 29 kgs. of 1-(2'-chloro-5'-sulfophenyl)-3-methyl-5-pyrazolone. The dyestuff is isolated and dried; it is obtained in the form of a water-soluble brown-yellow powder which dyes wool, in a neutral or acid bath, very fast greenish-yellow tints.

1-isoheptylamino-4-nitrobenzene is obtained by condensing 1-chloro-4-nitrobenzene-2-sulfonic acid with isoheptylamine of the following probable formula:

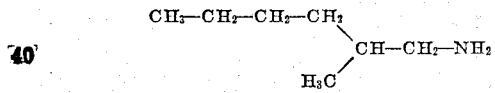

(obtainable by treating with ammonia and hydrogen, under pressure, the corresponding aldehyde containing 7 carbon atoms which is formed as a by-product in the synthesis of methanol) and splitting off the sulfonic acid group.

4. 34.4 kgs. of 1-amino-4-N-cyclohexyl-caprinyl-aminobenzene are diazotized, and the diazo compound obtained is combined with a solution, alkaline with sodium carbonate, of 50 kgs. of 1-(2'.5'-dichlorobenzoylamino)-8-hydroxy-naphthalene-4.6-disulfonic acid. The dyestuff is isolated and dried; it is obtained in the form of a water-soluble red powder and dyes wool, in a neutral bath, brilliant red tints. The dyeings obtained with this dyestuff display very good fastness properties, they are particularly fast to washing, fulling, perspiration and light.

By combining the same diazo component with equivalent amounts of 1-benzoylamino-8-hydroxynaphthalene-4.6-disulfonic acid, 1-benzoylamino-8-hydroxynaphthalene-3.6-disulfonic acid, 1-(2'.5'-dichloro-benzoylamino)-8-hydroxy-naphthalene-3.6-disulfonic acid or 1-(4'-chloro-2'.5'-dimethyl-phenyl-sulfonyl-amino)-8-hydroxynaphthalene-3.6-disulfonic acid, there are obtained blue-red dyestuffs which dye wool or silk somewhat more bluish red tints of similarly good properties.

If the capric acid radical contained in the diazo component is replaced by the radicals of a mixture of fatty acids containing seven to nine carbon atoms, dyestuffs are obtained which on wool yield dyeings having nearly the same tints and similarly good fastness properties as regards fulling and perspiration, and a still somewhat better fastness to light.

5. 34.4 kgs. of 1-amino-4-N-n-butyl-cyclohexylcapronylaminobenzene of the following formula:

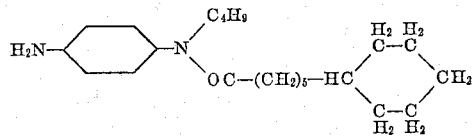

are diazotized, and the diazo compound obtained is combined with a solution, alkaline with sodium carbonate of 43 kgs. of 1-benzoylamino-8-hydroxynaphthalene-4.6-disulfonic acid. The dyestuff is isolated and dried; it is obtained in the form of a water-soluble dark-red powder and dyes wool, in a neutral bath, very fast, intense, blue-red tints.

By means of 1-chloro-acetylamino-8-hydroxy-naphthalene-4.6-disulfonic acid, 1-(2'.5'-dichlorobenzoylamino)-8-hydroxynaphthalene-4.6-disulfonic acid or similar coupling components, there are obtained dyestuffs which dye wool red tints being somewhat more yellow, the dyeings having properties similar to the others.

6. 34.6 kgs. of 1-amino-4-N-cyclohexyl-isoheptyloxy-oxyacetyl-aminobenzene of the formula:

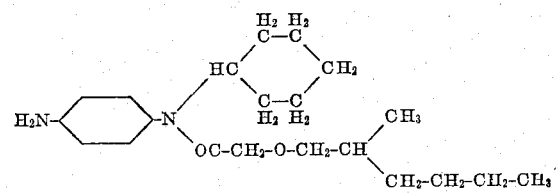

are diazotized, and the diazo compound obtained is combined with a solution, alkaline with sodium carbonate, of 26 kgs. of 1-(4'-sulfophenyl)-3-methyl-5-pyrazolone. The product is isolated and dried; it is obtained in the form of a reddish-yellow powder which dyes wool, in a neutral bath, fast greenish-yellow tints.

7. 37.2 kgs. of 1-amino-4-N-cyclohexyl-laurylamino-benzene are diazotized, and the diazo compound obtained is combined with a solution, alkaline with sodium carbonate, of 44 kgs. of 1-chloroacetylamino-8-hydroxy-naphthalene-4.6-disulfonic acid. The dyestuff is isolated and dried; it is a red powder which dyes wool, in a neutral bath very fast vivid red tints.

A somewhat more bluish dyestuff having similar properties is obtained with 1-acetylamino-8-hydroxy-naphthalene-3.6-disulfonic acid.

Quite similar dyestuffs are obtained, for instance, by using 1-amino-4-N-isoheptyl-caprinyl-amino-benzene, 1-amino-4-N-ethyl-stearyl-aminobenzene, 1-amino-4-N-isoheptyl-palmityl-aminobenzene and the like.

8. 34.4 kgs. of 1-amino-4-N-cyclohexyl-caprinyl-aminobenzene are diazotized, and the diazo compound obtained is combined with an aqueous solution of the sodium salt of 50 kgs. of 1-(2'-chlorophenoxy-acetylamino)-8-hydroxy-naphthalene-4.6-disulfonic acid, in the presence of an excess of sodium carbonate.

The dyestuff thus obtained is isolated and dried; it is a red water-soluble powder which dyes wool, in a neutral bath, vivid scarlet tints of very good fastness to washing, perspiration, fulling and over-dyeing and of very good fastness to light.

The following table illustrates a number of further dyestuffs which may be obtained according to the present invention:

| Diazo component | Azo component | Shade on wool |
|---|---|---|
| 1-amino-4-N-ethyl-stearyl-aminobenzene | 1-benzoylamino-8-hydroxynaphthalene-4.6-disulfonic acid | Bluish red. |
| 1-amino-4-N-isopropyl-cyclohexylpropionyl-aminobenzene | 1-(2'-chloro-6'-methyl-4'-sulfophenyl)-3-methyl-5-pyrazolone. | Greenish-yellow. |
| 1-amino-4-N-n-butyl-cyclohexylpropionyl-aminobenzene | do | Do. |
| 1-amino-2-methyl-5-N-ethyl-caprinyl-aminobenzene | 1-(2',5'-dichlorobenzoylamino)-8-oxynaphthalene- 4.6 - disulfonic acid. | Bluish-red. |
| 1-amino-4-N-isoheptyl-caprinyl-aminobenzene | do | Do. |
| 1-amino-4-N-isoheptyl-laurinyl-aminobenzene | do | Do. |
| 1-amino-4-N-cyclo-hexyl-isooenanthyl-aminebenzene | 1-(4'-sulfophenyl)-3-methyl-5-pyrazolone | Reddish yellow. |
| 1-amino-4-N-cyclohexyl-caprinylamino-aminobenzene | 1-(2'-chloro-6'-methyl-4'-sulfophenyl)-3-methyl-5-pyrazolone. | Greenish yellow. |
| 1-amino-4-N-cyclohexyl-[oenanthyl-capryl- or pelargonyl-aminobenzene]. | do | Do. |
| 1-amino-4-N-cyclohexyl-caprinyl-aminobenzene | 1-(2'-chloro-5'-sulfophenyl)-3-methyl-5-pyrazolone | Do. |
| 1-amino-2-N-cyclohexyl-caprinyl-aminobenzene | do | Do. |
| 1-amino-4-N-cyclohexyl-caprinyl-aminobenzene | 1-(2',5'-dichloro-4'-sulfophenyl)-3-methyl-5-pyrazolone | Do. |
| 1-amino-4-N-cyclohexyl-hexahydrobenzoyl-aminobenzene | 1-(2'-chloro-5'-sulfophenyl)-3-methyl-5-pyrazolone | Do. |
| 1-amino-4-N- cyclohexyl- cyclohexylpropionyl -aminobenzene. | 1-(2'-chloro-6'-methyl-4'-sulfophenyl)-3-methyl-5-pyrazolone | Do. |
| Do | 1-(3'-sulfophenyl)-3-methyl-5-pyrazolone | Reddish yellow. |
| Do | 1-(2'-sulfophenyl)-3-phenyl-5-pyrazolone | Orange-yellow. |
| Do | 1-(2'-methyl-4'-sulfophenyl)-3-methyl-5-pyrazolone | Yellow. |
| Do | 1-(2'-chloro-4'-sulfophenyl)-3-methyl-5-pyrazolone | Greenish yellow. |
| Do | 1-(2',5'-dichlorobenzoyl-amino)-8-hydroxy-naphthalene-4.6-disulfonic acid. | Bright bluish red. |
| 1-amino-4-N-cyclohexyl- cyclohexyl- capronyl-aminobenzene. | 1-(2'-chloro-6'-methyl-4'-sulfophenyl)-3-methyl- 5- pyrazolone. | Greenish yellow. |
| Do | 1-(4'-nitrobenzoyl-amino)-8-hydroxynaphthalene-4.6-disulfonic acid. | Bluish red. |
| 1-amino-4-N-phenyl-caprinyl-aminobenzene | 1-(4'-sulfophenyl)-3-methyl-5-pyrazolone | Reddish-yellow. |
| 1-amino-2-methyl-5-N-benzyl-caprinyl-aminobenzene | 1-(2',5'-dichloro-benzoylamino)-8-hydroxynaphthalene-4.6-disulfonic acid. | Bluish-red. |
| 1-amino-3-methoxy-4-N-benzyl-caprinyl-aminobenzene | 1-benzoylamino-8-hydroxy-naphthalene-4.6-disulfonic acid. | Red-violet. |
| 1-amino-4-N-benzyl-caprinyl-aminobenzene | 1-(2'-chloro-5'-sulfophenyl)-3-methyl-5-pyrazolone | Greenish yellow. |
| Do | 1- (4'- chloro - 2',5'- dimethylphenylsulfonylamino) -8-oxy-naphthalene-3.6-disulfonic-acid. | Violet-red. |
| 1-amino-2-methyl-5-N-benzyl-caprinyl-aminobenzene | 1-(2'-chloro-6'-methyl-4'-sulfophenyl)-3-methyl-5-pyrazolone. | Greenish yellow. |

We claim:

1. The compounds of the general formula:

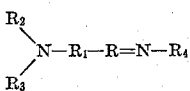

wherein $R_1$ represents an aryl group of the benzene series, $R_2$ represents a member of the group consisting of aryl of the benzene series, aralkyl of the benzene series, cycloalkyl and alkyl containing less than ten carbon atoms, $R_3$ represents radical of a carboxylic acid of the formula:

—CO—X wherein X represents a member of the group consisting of alkyl, -alkyl-cycloalkyl and cycloalkyl, the sum of the carbon atoms in the carboxylic acid radical amounting to at least six, the sum of the carbon atoms in the radicals $R_2$ and $R_3$ amounting to at least twelve, $R_4$ represents the radical of a coupling component of the group consisting of pyrazolone-1-aryl-sulfonic-acids, aryl being of the benzene series, and 1-acylamino-8-hydroxy-naphthalene-disulfonic acids.

2. The compounds of the general formula:

wherein $R_2$ represents a member of the group consisting of aryl of the benzene series, aralkyl of the benzene series, cycloalkyl and alkyl containing less than ten carbon atoms, $R_3$ represents the radical of a carboxylic acid of the formula:

—CO—X wherein X represents a member of the group consisting of alkyl, -alkyl-cycloalkyl and cycloalkyl, the sum of the carbon atoms in the carboxylic acid radical amounting to at least six, the sum of the carbon atoms in the radicals $R_2$ and $R_3$ amounting to at least twelve, $R_4$ represents the radical of a coupling component of the group consisting of pyrazolone-1-aryl-sulfonic acids, aryl being of the benzene series, and 1-acylamino-8-hydroxy-naphthalene-disulfonic acids.

3. The compounds of the general formula:

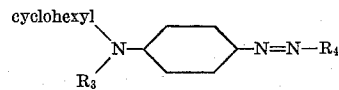

wherein $R_3$ represents the radical of a carboxylic acid of the formula:

—CO—X wherein X represents a member of the group consisting of alkyl, -alkyl-cycloalkyl and cycloalkyl, the sum of the carbon atoms in the carboxylic acid radical amounting to at least six, $R_4$ represents the radical of a coupling component of the group consisting of pyrazolone-1-aryl-sulfonic acids, aryl being of the benzene series, and 1 -acylamino- 8 -hydroxy-naphthalene-disulfonic acids.

4. The compound of the formula:

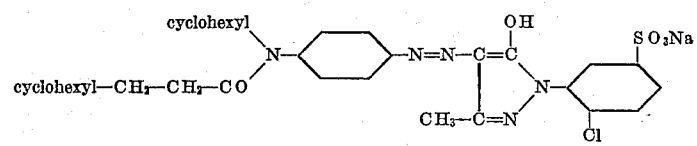

being a watersoluble greenish yellow dyestuff which dyes wool in a neutral bath greenish-yellow tints of very good fastness to washing, fulling and light.

5. The compound of the formula:

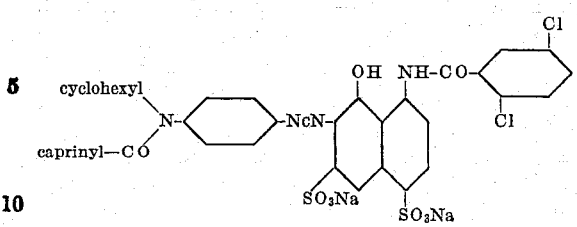

being a watersoluble red dye stuff which dyes wool in a neutral bath bright red tints of very good fastness to washing, fulling, perspiration and light.

6. The compound of the formula:

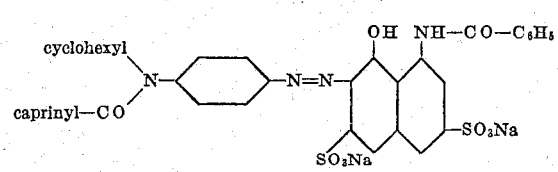

being a watersoluble bluish red dye stuff which dyes wool in a neutral bath bluish red tints of good fastness to washing, fulling and light.

RICHARD FLEISCHHAUER.
ERNST KORTEN.